(12) United States Patent
Horanoff

(10) Patent No.: US 7,647,889 B2
(45) Date of Patent: Jan. 19, 2010

(54) APPARATUS FOR A LITTER BOX

(76) Inventor: Jerry Horanoff, 108 Edgefield Dr., Dowingtown, PA (US) 19335

(*) Notice: Subject to any disclaimer, the term of this patent is extended or adjusted under 35 U.S.C. 154(b) by 136 days.

(21) Appl. No.: 11/540,129

(22) Filed: Sep. 29, 2006

(65) Prior Publication Data

US 2007/0089679 A1   Apr. 26, 2007

Related U.S. Application Data

(60) Provisional application No. 60/728,426, filed on Oct. 20, 2005.

(51) Int. Cl.
*A01K 1/035* (2006.01)
(52) U.S. Cl. ........................ 119/163; 119/166
(58) Field of Classification Search ................. 119/161, 119/163, 165, 166
See application file for complete search history.

(56) References Cited

U.S. PATENT DOCUMENTS

| | | | |
|---|---|---|---|
| 4,096,827 A * | 6/1978 | Cotter ........................ 119/166 |
| 4,120,264 A | 10/1978 | Carter | |
| 4,846,104 A | 7/1989 | Pierson, Jr. | |
| 4,886,014 A * | 12/1989 | Sheriff ........................ 119/166 |
| 5,003,920 A | 4/1991 | Miksitz | |
| 5,048,465 A | 9/1991 | Carlisi | |
| 5,117,780 A * | 6/1992 | Wooten et al. ............... 119/162 |
| 5,167,204 A * | 12/1992 | Nussle ......................... 119/166 |
| 5,178,099 A * | 1/1993 | Lapps et al. .................. 119/166 |
| 5,259,340 A | 11/1993 | Arbogast | |
| 5,394,833 A | 3/1995 | Glass | |
| 5,402,751 A * | 4/1995 | De La Chevrotiere ....... 119/166 |
| 5,507,252 A | 4/1996 | Ebert | |
| 5,601,052 A * | 2/1997 | Rood et al. .................. 119/166 |
| 5,622,140 A * | 4/1997 | McIlnay-Moe ............. 119/166 |
| 5,662,066 A | 9/1997 | Reitz | |
| 5,785,000 A * | 7/1998 | Barbary ...................... 119/166 |
| 5,823,137 A * | 10/1998 | Rood et al. .................. 119/166 |
| 5,911,194 A * | 6/1999 | Pierson, Jr. ................. 119/166 |
| 5,931,119 A | 8/1999 | Nissim et al. | |
| 6,286,459 B1 | 9/2001 | Parr | |
| 6,289,847 B1 | 9/2001 | Carlisi | |
| 6,463,881 B1 | 10/2002 | Reitz | |
| 6,494,165 B2 * | 12/2002 | Asbury ....................... 119/166 |
| 6,588,369 B2 | 7/2003 | Carlisi | |
| 6,701,868 B1 | 3/2004 | Shepherd | |
| 6,997,137 B1 * | 2/2006 | Ricke .......................... 119/168 |
| 7,198,006 B2 * | 4/2007 | Fischer ....................... 119/166 |
| 2007/0056521 A1 * | 3/2007 | Caputa et al. ............... 119/166 |

\* cited by examiner

*Primary Examiner*—Rob Swiatek
*Assistant Examiner*—Kristen C Hayes

(57) ABSTRACT

A litter box has two unit assemblies and a waste receptacle. The first unit assembly has an unenclosed litter compartment; a compartment to temporarily hold filtered litter; and a pivotally mounted screen that filters out waste material from the litter. The second unit assembly is a support base having a motor mounted thereto that manipulates the first unit assembly, and contains a motion sensor and controller. The first unit assembly is partially rotated by the motor which causes litter and waste to move away from the litter compartment towards the temporary compartment. The screen filters litter and waste only allowing filtered litter to enter the temporary receptacle, forcing waste solids to pass by the temporary compartment into the waste receptacle. The motor reverses, and the filtered litter in the temporary receptacle is communicated back into the litter compartment by passing through and under or back through the screen.

27 Claims, 7 Drawing Sheets

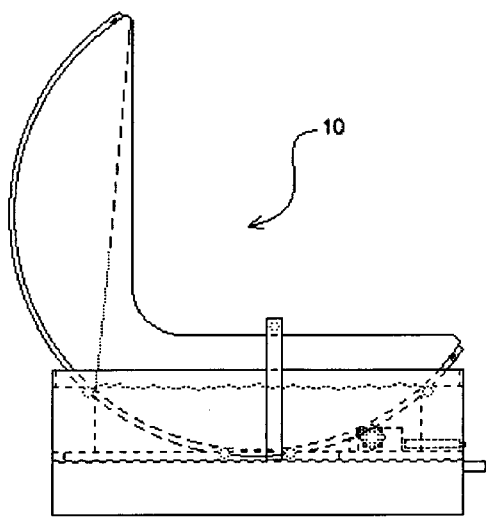 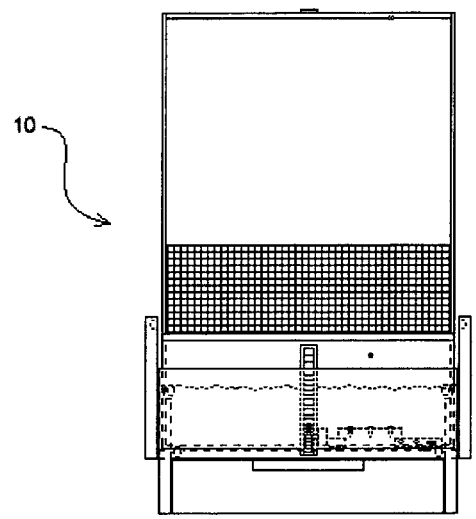
Figure 3                    Figure 4

First Phase: Separation – first partial rotation (counter-clockwise):

Second Phase: Litter Reintroduction – second partial rotation (clockwise):

Third Phase: Return to Home Position – third partial rotation (counter-clockwise):

APPARATUS FOR A LITTER BOX

PRIOR PROVISIONAL APPLICATION

The present application claims the benefit of U.S. Provisional Application Ser. No. 60/728,426, filed Oct. 20, 2005, which is hereby incorporated by reference in its entirety.

FIELD OF THE INVENTION

The current invention relates to an apparatus and method for separating and removing animal waste material from litter, and in particular, to a technique that automatically removes cat waste material from litter in an unenclosed litter box.

BACKGROUND OF THE INVENTION

Many advances in technology related to automatic litter boxes have arisen to help improve the cleanliness of the litter box. One of the most significant advances is the use of what's called the "sifting method" of filtering litter. The sifting method has been employed by such devices as described in U.S. Pat. Nos. 4,846,104; 4,120,264; 5,507,252 and 5,662,066 (see also U.S. Pat. No. 6,463,881). The sifting method is significantly more effective than the so-called "raking method" (or "combing method") as described in U.S. Pat. No. 5,048,065. The sifting method of cleaning litter has two major advantages over the raking method in that it is far more resistant to clogging, and generally does a much better job of cleaning the litter. Gravity is used to separate the litter from waste material instead of forcing a rake through the litter to remove solid waste material. The major flaw with the raking method is that a motor forces not only the rake through litter, but also the solid waste material though the litter as well. Although the rake can be made in such a way to travel relatively easily through litter, the unpredictable shapes and generally large surface area of solid waste makes it difficult to force waste clumps through such a dense and heavy material such as clay litter. The typical behavior of cats to bury their clumps makes this process even more difficult.

There are often many undesirable effects with using such a raking method. One such effect is that clumps and other solid material can be wedged between the rack and the bottom of the litter pan, which can cause a smearing effect. The gradual build-up of such debris makes subsequent raking phases more and more difficult. Another such effect is that the mass of the litter itself helps to force litter clumps and other solid material in between the tines of the rake. In this scenario, gravity is actually hindering the filtering process. Because gravity is forcing the litter into the pan, the litter wants to stay where it is situated. As the rake and solid debris travel from one end of the litter pan to the other, the litter has to move out of the way of the debris, or be force to move in front of the debris itself and end up in the waste receptacle. The only way for the litter to get out of the way is to go above the debris, below the debris, or around the debris to either side. Gravity is always forcing the litter into the pan, and the litter that is forced to move out of the way of the debris is compressed against other litter within the litter pan. When the debris is close to the side of the litter pan, resistance is even greater. The options for which direction the litter can move are reduced, and further smearing can occur, and the increased force on the debris can further force the debris into the tines of the rake, clogging the rake. To compound the problem, it's common for cats to bury their waste into a corner, making a significant portion of the litter end up on one side of the litter pan. This makes it extremely difficult for the rake to filter the unevenly covered litter pan.

Because of these problems, there is usually a narrow range at which the litter must be maintained. Too little litter, and the clumps will stick to the bottom of the litter pan. To high a level, and the force required to push the rake and the debris through the litter is too great for the device to handle. Aside from a clogged rake making the litter box ineffective, it also increases stress on the mechanical parts, motor, and power consumption. It is also extremely difficult to unclog the rake, as well as being an extremely undesirable task to take on. U.S. Pat. No. 6,851,386 tries to address this problem by introducing a rake that is less susceptible to clogging; however the raking method itself cannot change the force of gravity working against the debris or the mass of the clay. Although significantly less clogging is achieved by this new rake design, the effect is that instead of clogging, the rake actually breaks up the clumps and/or other solid material into smaller pieces, traveling through the rake instead of into the waste receptacle where it is intended to be communicated. This results in an incomplete cleaning process. Clogging can also be reduced by increasing the angle on the tines of the rake to reduce the negative impact gravity has on the filtering process; although this improves the process, it does so only to a certain degree. Although the raking method has numerous disadvantages, it has the significant advantage in that an open litter box design is easily achievable. The importance of this feature will be described later.

The sifting method uses gravity to its advantage instead of to its disadvantage. Instead of moving relatively large masses of solid debris through dense clay litter, the sifting method uses gravity to make the litter move around the solid waste debris. The forces in effect are always relatively close to 1G, and no greater force than this is required to separate the solid material from the litter. The screen used to filter litter from solid waste material is therefore not subjected to the forces required by the raking method, and clogging is avoided. This method draws a parallel to the frequently demonstrated science experiment where a jar, a collection of small particles (e.g. sand), and a collection of larger particles (e.g. marbles) are provided. The sum volume of the small and large particles is such to approximate the volume of the jar. If the small particles are placed in the jar first, and then an attempt is made to place the larger particles in the jar, the effect of gravity on the small particles in the jar prevents them from moving out of the way to make room for the larger particles; however, by placing the larger objects in the jar first, and pouring the smaller particles in the jar second, the smaller particles will easily move around the larger objects, filling the jar with ease. This is another example of how gravity is used to help solve the problem, rather than hindering it from being solved. This principle is applied when the sifting method is employed, and provides a predictable, clog-free method of separating litter from solid waste material.

Many products today employ the sifting method. One of the more advanced products is described in U.S. Pat. No. 6,463,881, where a globe-like structure is used to house filtered litter, a sifting mechanism, and to provide a certain amount of room for an animal, as well as a hole through which the animal can ingress/egress the globe. This product is far superior in filtering litter than a product that utilizes the raking method, but is an enclosed unit which as certain disadvantages. Being an enclosed litter box, this product does have the advantage of making it far more difficult for the cat to throw litter outside of the litter box; however there are also significant disadvantages as well. The first and most important of which is that many cats simply will not use enclosed litter boxes. Secondly, this product must have ports in the globe that open to let waste exit the globe and fall into the waste receptacle. These ports limit the size of the clumps that can fit through these the ports, preventing the use of the device for cats that create large clumps; this particularly true for cats with diabetes, as the clumps will not fit through the ports. Thirdly, it is relatively difficult to introduce fresh litter into the globe as well as clean the globe (which is recommended to be done periodically). Furthermore, there are weight restrictions for cats that must be within a 5-15 lbs. range. A cat less than 5 lbs. will not weigh enough to trigger the sensor, and cats over 15 lbs. will have trouble fitting into the globe.

U.S. Pat. No. 5,167,204 attempts to use a rake-like structure, but through manual manipulation effectively employs a sifting mechanism. This has the significant advantage of using the sifting method while still providing a traditional open litter box that's attractive to the largest population of cats; however this mechanism has multiple disadvantages, the first of which is that the device would have to be very large in order to create a litter area large enough for a typical feline to use effectively. The second disadvantage is that the mechanism is not automated, and would be difficult to automate. The third disadvantage is that it is would be very difficult to level the litter without picking up the entire litter box and shaking it around.

The raking method does have a significant advantage in that the process itself is conducive to the traditional open litter box design. Although it's possible to place an enclosure around such a litter box to help contain litter, an enclosure is not required in order to make the litter box operate. A litter box is only effective if the cat will use the device, and because many cats will simply not uses enclosed litter boxes, a perfectly designed enclosed system will not do the job if the cat does not elect to use it. For those cats that will not use an enclosed device, the alternative is that the cat will either use an unenclosed litter box if available, or an undesirable location if not available. Even cats that will use an enclosed litter box will often prefer an unenclosed litter box if given the choice. This makes it even more difficult to get the value out of a potentially expensive enclosed litter box device if a pet owner has multiple cats. Even if only one cat within a multi-cat household will not use an enclosed litter box, it is often the expectation of the pet owner to reap the benefits of the enclosed device with the cats that will use the enclosed device, while for the cat or cats that will not use the enclosed device, deal with the added labor involved in maintaining the unenclosed device for those stubborn cats only. However, because many cats that would otherwise use the enclosed device if that were their only option will often use the unenclosed device when given the choice, the effectiveness of the enclosed device is further reduced, as it gets used even less frequently than expected by the cat owner.

The challenge is thus to create an automated litter box that has superior filtering capabilities by utilizing the sifting method, and yet has an open design to encourage use by as many household pets as possible. It is against this background and the need to solve these problems not addressed by prior art that the present invention was developed.

SUMMARY OF THE INVENTION

Accordingly, it is an object of the present invention to provide an automatic litter box to employ a superior cleaning method that uses a screen and a temporary container, as well as a method for altering the relationship of the appropriate components relative to the vector force of gravity.

It is another object of the present invention to provide an automatic litter box that is unenclosed to facilitate usage by all household pets.

It is also an object of the present invention to provide an automatic litter box that significantly limits any unpleasant odors emanating from the litter box.

It is yet another object of the present invention to provide an automatic litter box that is unenclosed to help facilitate cleaning and adding of litter.

It is a further object of the present invention to provide an automatic litter box that does not significantly limit the size or weight of the pet.

It is yet a further object of the present invention to provide an automatic litter box that can be used with pets, such as cats, that have diabetes.

It is also an object of the present invention to provide an automatic litter box that can use traditional, inexpensive clumping litter.

Another object of the present invention is to provide an automatic litter box that eliminates or significantly reduces mental stress of the pet owner.

It is also an object of the present invention to provide an automatic litter box that more effectively seals off the waste receptacle to reduce odor and mold, and therefore allows the size of the waste receptacle to be increased, which will reduce the frequency required to empty the litter box.

Additional objects, advantages, and novel features of this invention shall be set forth in the description that follows, and will also become apparent to those of reasonable skill in the art upon examination of the following specification. The objects and advantages of the invention may be realized and attained by means of the instrumentalities, combinations, and methods particularly pointed out in the appended claims.

To achieve the foregoing and other objects and in accordance with the purpose of the present invention, as embodied and broadly described herein, an apparatus is disclosed for receiving and disposing of waste material from an animal, typically a cat. The apparatus includes a first unit assembly comprising an unenclosed litter compartment, a temporary receptacle, and a filtering screen. The unenclosed litter compartment allows an animal to ingress and egress the unenclosed litter compartment from multiple directions, and is also not covered from above. The temporary receptacle is provided to store filtered litter during the cleaning cycle. The unenclosed litter compartment and the temporary compartment are attached in such a way as to share at least one common surface continuation. This surface continuation may be described as a partial cylinder, although other continual shapes including but not limited to shapes such as partial sphere would also work. This common surface continuation (also described as the "common outer surface") allows for a partial rotation of the unit assembly along that continual surface so as to affect the movement of litter and waste material out of the unenclosed litter compartment and into the temporary receptacle. A filtering screen is located between the unenclosed litter compartment and the temporary compartment. The screen covers the opening of the temporary compartment only allowing filtered litter to enter the temporary compartment. This screen may be pivotally mounted in order to allow filtered litter to more easily flow out of the temporary compartment and back into the unenclosed litter compartment after the filtering phase. A track may be disposed along the continual surface, and may follow the curved shape. This track may be attached to, or molded as, part of the continual surface. The track is designed to receive a sprocket that is turned by a motor.

A support base is used to support and manipulate the first unit assembly in order to clean the litter box and dispose of waste into a waste receptacle. A waste receptacle may fit within and under the support base. The support base may also house electronics to activate and control the device. The support base may include a motor and a sprocket. The sprocket mates with the track of the first unit assembly. When the motor turns the sprocket, the first unit assembly is forced to rotate in the opposite direction of the sprocket rotation. This motor is triggered to perform a cleaning cycle through the use of a motion sensor. For example, a cat may break a beam of infrared light transmitted from an infrared emitter to an infrared detector. The controller senses the beam interruption, and begins a delay function after the beam transitions back from the interrupted state to the uninterrupted state. After a determinate amount of time (typically between 5 and 10 minutes), the physical cycle is triggered. The physical cycle may involve three partial rotations of the first unit assembly. The first partial rotation is a cleaning rotation whereby litter is communicated from the unenclosed litter compartment into the temporary receptacle. This partial rotation filters out solid waste material. Whereas litter may travel freely through the screen and into the temporary compartment, solid waste material is forced to bypass the temporary compartment, sliding over top of the screen and temporary compartment at the appropriate time during the first partial rotation. The solid waste material may then slide through a large hole within the support base, and into a waste receptacle.

After the filtering phase, a litter-reintroduction phase may be performed whereby filtered litter is communicated out of the temporary compartment back into the unenclosed litter compartment. This is achieved by reversing the motor's rotational direction thereby reversing the rotation of the first unit assembly. This phase may over-rotate the First Unit Assembly in order to level the litter within the unenclosed litter compartment. The over-rotation may be employed to overcome the frictional resistance of the litter and the inner surface of the unenclosed litter compartment. The motor may then reverse direction again, and return the first unit assembly to the home position. While the First Unit Assembly is situated in the home position, substantial odor may be prevented from escaping the device by providing reasonable tolerances along the inside top edge of the Second Unit Assembly in relation to the proximity of the edges of the First Unit Assembly. The Second Unit Assembly may be constructed in such a way as to mate with the First Unit Assembly in order to substantially prevent odor from escaping from the waste receptacle. To further this goal, a flexible gasket material made of fur-like or other material may be used. This material may be flexible enough to help seal any gap between the First and Second Unit Assemblies, but also not produce substantial friction that would otherwise hinder the operation of the device. This gasket material can substantially reduce or eliminate odor emanating from the waste receptacle and decreasing the frequency required to empty the litter.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention, in which:

FIG. 3 is a side view of an assembled device;

FIG. 4 is a front view of an assembled device;

COMPONENT IDENTIFICATION

Figure 1A:
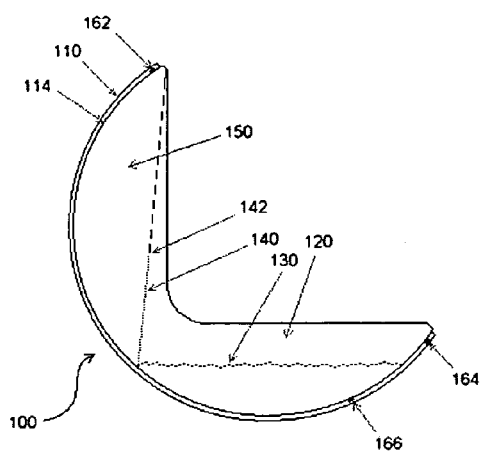
FIG. 1A-1C are side views of unit assemblies and their major components for one embodiment.

100 First Unit Assembly
120 Unenclosed litter compartment
122 Sidewalls
123 Raised sidewall extensions
124 Front, inside surface of sidewall
150 Compartment to temporary hold filtered litter
140 Screen to filter litter that is pivotally mounted
130 Litter
132 Animal waste material
142 Screen attachment location where a flexible or non-flexible screen is pivotally attached, or a where a flexible screen is not pivotally attached
110 Track that motor and sprocket uses to manipulate the First Unit Assembly
114 Common outer surface of First Unit Assembly
128 Lip
129 Drip cap
162 Position sensor trigger 1
164 Position sensor trigger 2
166 Position sensor trigger 3
170 Slats
180 Membrane
182 Top portion of membrane
184 Bottom portion of membrane
200 Second Unit Assembly
201 Opening length span of Second Unit Assembly
202 Opening width span of Second Unit Assembly
210 Wheels on which the First Unit Assembly rides
250 Controller
252 On/off button
240 Motion detector
242 Infrared transmitter
244 Infrared detector
230 Sidewalls
231 Front panel
232 Rear panel
220 Drive unit
222 Sprocket
224 Motor
260 Position sensing unit
262 Position sensor 1
264 Position sensor 2

266 Position sensor 3
300 Waste Receptacle
301 Waste receptacle handle

DETAILED DESCRIPTION

With reference to FIGS. 1-4, an embodiment of the instant invention 10 includes a First Unit Assembly 100, a Second Unit Assembly 200 and a Waste Receptacle 300. The Second Unit Assembly 200 provides a base that rests on a floor, counter, or other flat surface that is accessible by one or more pets, such as a cat or cats. The First Unit Assembly 100 rests on rollers 210 and a sprocket 222 of the Second Unit Assembly 200, and is prevented from moving laterally by a track 110 on a common outer surface 114 of the First Unit Assembly 100 and sidewalls 230 of Second Unit Assembly 200. A home position for the First Unit Assembly 100 is a position such that the top of the side walls 122 of the unenclosed litter compartment 120 are approximately parallel to the top of the sidewalls 230 of the Second Unit Assembly 200 and such that when litter 130 is placed in the unenclosed litter compartment 120, the litter 130 will rest at level state, as depicted in FIG. 3. When the First Unit Assembly 100 is properly positioned on top of the Second Unit Assembly 200, an infrared transmitter 242 and infrared detector 244 of a motion sensor 240 on the Second Unit Assembly 200 have a line of sight from one to the other that is unobstructed by the First Unit Assembly 100. The Waste Receptacle 300 may be inserted from either the front or rear of the Second Unit Assembly 200 such that the waste receptacle 300 is directly under the Second Unit Assembly 200, as shown in FIGS. 3 and 4. Litter 130 is placed in the unenclosed litter compartment 120.

1. Initialization

The Second Unit Assembly also includes a controller 250. Power is applied to the controller 250 by, for example, use of a 12-volt power adapter. A component of the controller 250 is a switch or button 252 that allows the unit to be turned on or off. The unit will automatically begin a physical cycle when power is applied and the power switch or button 252 puts the unit into the "on" mode. This physical cycle is described in the following (see the section 3 below, "Physical Cycle").

2. Obstruction Detection and Delay

After the unit 10 physically cycles once, the controller 250, through use of the motion sensor 240, having the infrared transmitter 242 and infrared detector 244, detects the presence of a pet, such as a cat, by means of the pet's obstruction of the line of sight from the infrared transmitter 242 to the infrared detector 244. This detection mechanism is a common technique utilized by those familiar with the art of motion detection through use of electronics. Once the pet leaves the unenclosed compartment 120, line of sight between the infrared transmitter 242 and infrared detector 244 is reestablished, triggering a timer that is a component of the controller 250. As known in the art, such timers are common components of device controllers, such as the controller 250. The timer's purpose is to permit sufficient time for the litter to "clump," and also to allow enough time for the pet to vacate the immediate area so as not to needlessly startle the pet when the unit begins to cycle. If at any time an obstruction is detected between the infrared transmitter 242 and infrared detector 244 while the timer is active, the timer process is aborted, and the timer process restarts only when the obstruction detected by the motion sensor 240 is removed from the unenclosed litter compartment 120, reestablishing line of sight between the infrared transmitter 242 and infrared detector 244. Once a predetermined amount of time has passed (for example, about 10 minutes) without any detected obstructions, the physical cycle begins.

3. Physical Cycle

Figure 5A:
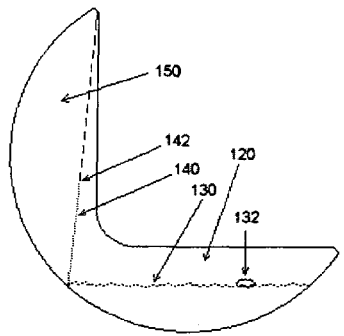
FIGS. 5A-5K illustrate a separation cycle of an embodiment device.
Figure 5B:
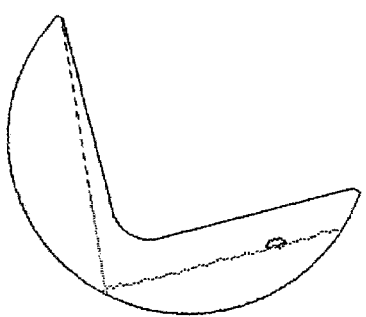
Figure 5C:
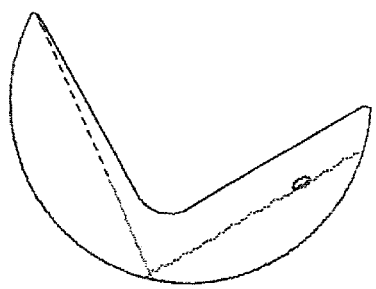
Figure 5D:
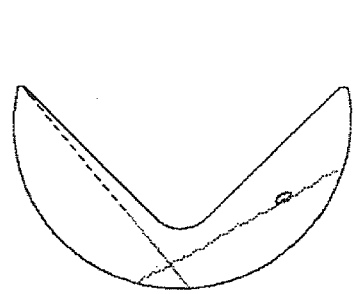
Figure 5E:
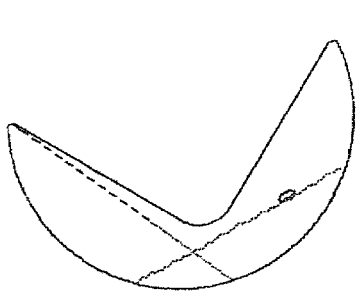
Figure 5F:
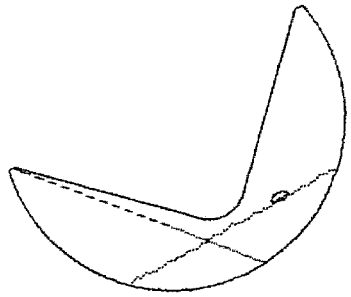
Figure 5G:
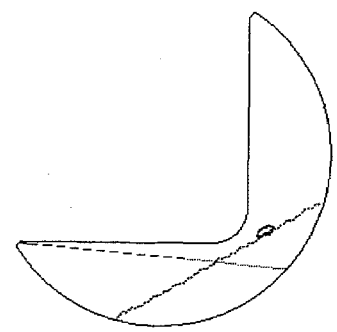
Figure 5H:
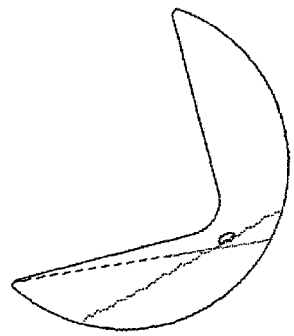
Figure 5I:
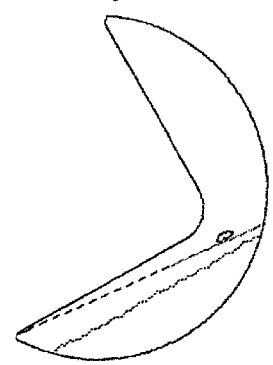
Figure 5J:
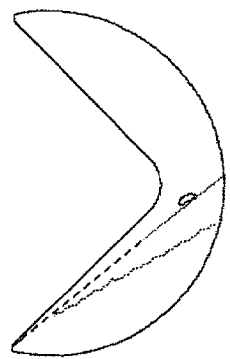
Figure 5K:
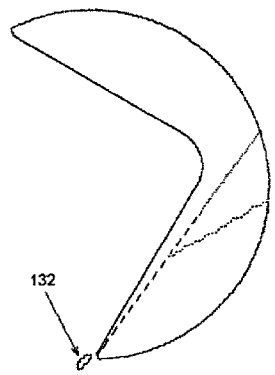
Figure 6A:
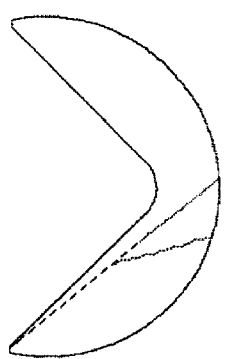
FIGS. 6A through 6L illustrate a reintroduction cycle of an embodiment device.
Figure 6B:
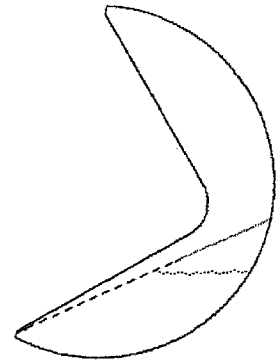
Figure 6C:
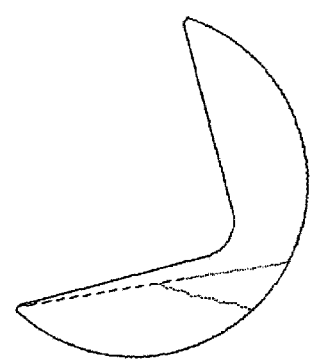
Figure 6D:
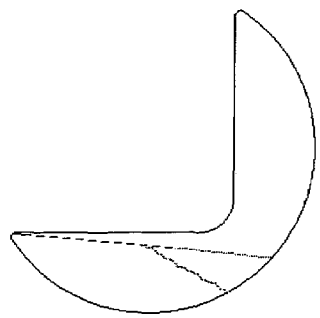
Figure 6E:
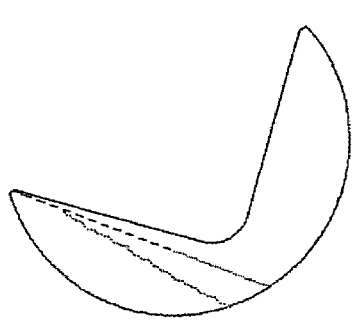
Figure 6F:
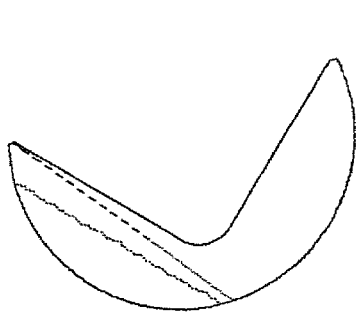
Figures 6G, 6H, 6I:
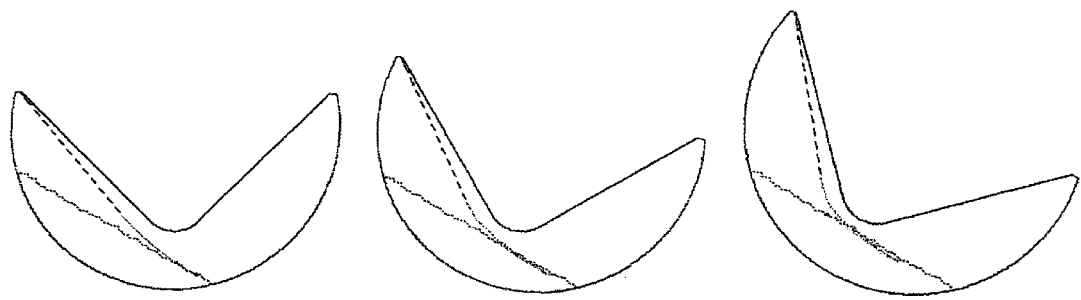
Figures 6J, 6K, 6L:
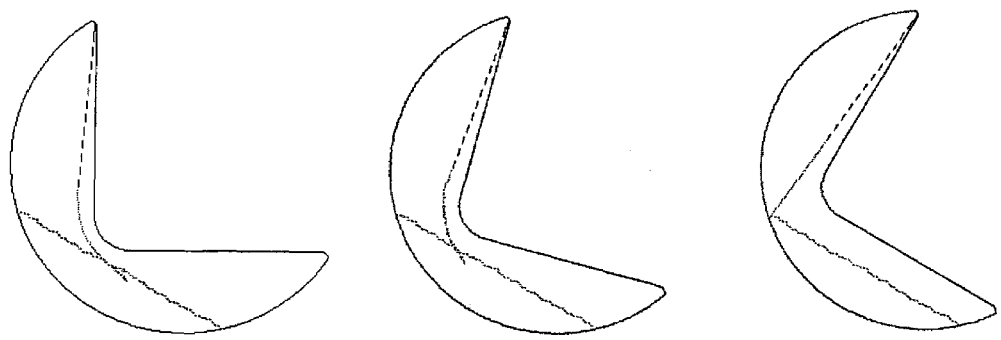

The physical cycle is described in three phases: The first phase is the "separation" (i.e. filtering) phase, the second phase is the "litter reintroduction" phase, and the third phase is the "return to home position" phase. The first phase is illustrated by FIGS. 5A through 5K. FIG. 5A identifies significant components of the First Unit Assembly 100 pertaining to the physical cycle. Furthermore, waste material 132 is identified in the FIGS. 5A-5K, and is the object to be separated from the litter 130.

Figure 2A:
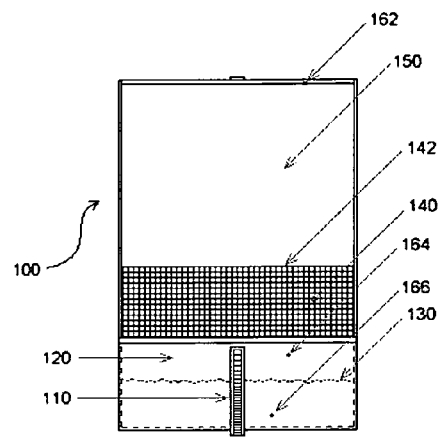
FIGS. 2A-2C are front views of the unit assemblies shown in FIGS. 1A-1C.
Figure 1B:
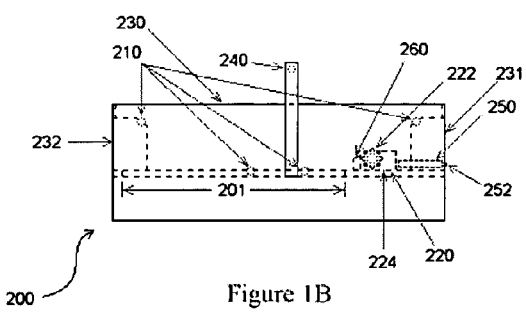
Figure 2B:
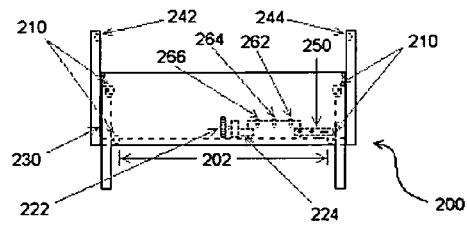
Figure 1C:
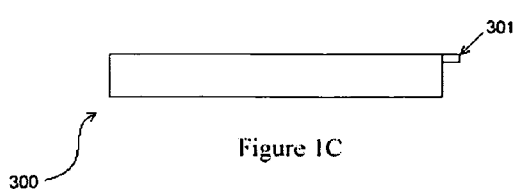
Figure 2C:
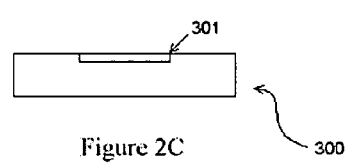

The physical cycle begins with the sprocket 222 turning through use of a motor 224 as controlled by the controller 250. The sprocket 222 and motor 224 together provide a drive unit 220 that drives the physical movement of the First Unit Assembly 100. As the sprocket 222 turns in a clockwise direction as viewed from FIG. 1, the First Unit Assembly 100 is rotated in a counter-clockwise direction due to the linkage of sprocket 222 of the Second Unit Assembly to the track 110 of the First Unit Assembly 100. The First Unit Assembly 100 is partially rotated as shown in FIGS. 5A through 5K; that is, the First Unit Assembly 100 does not undergo a full 360.degree. rotation. This partial rotation causes the combination of litter 130 and waste material 132 to move toward a screen 140. The screen 140 only allows filtered litter 130 to move into temporary container 150, forcing any waste solid 132 to pass by the temporary container 150 and into the waste receptacle 300. The first phase is terminated when a position sensor trigger 162 is detected by first position sensor 262 of a position sensing unit 260, as shown in FIG. 2. The result of the first phase is that waste solids 132 are removed from the litter 130, by exiting the First Unit Assembly 100, passing through the Second Unit Assembly 200 through opening 201/202, and into the Waste Receptacle 300.

The second phase of the physical cycle begins when the first phase of the physical cycle ends. The drive unit 220 causes the motion of the First Assembly Unit 100 to reverse. The controller 250 controls the motor 224 to reverse the rotation of the sprocket 222 and begin turning counter-clockwise as viewed from FIG. 1, causing the First Unit Assembly 100 to rotate in a clockwise direction. The First Unit Assembly 100 is partially rotated, as shown in FIGS. 6A through 6L. This causes the filtered litter 130 to be communicated out of the temporary container 150 by passing through and under the screen 140, back into the unenclosed litter compartment 120 to its original position. The second phase ends when a second position sensor trigger 164 is detected by second position sensor 264 of position sensing unit 260, as shown in FIG. 2. Note that the location of the second position sensor trigger 164 may be set to correspond to the approximate angle of repose of the litter 130, so that at the end of the second cycle, the level of the litter 130 is approximately parallel with the sidewalls 122.

Figures 7A, 7B:
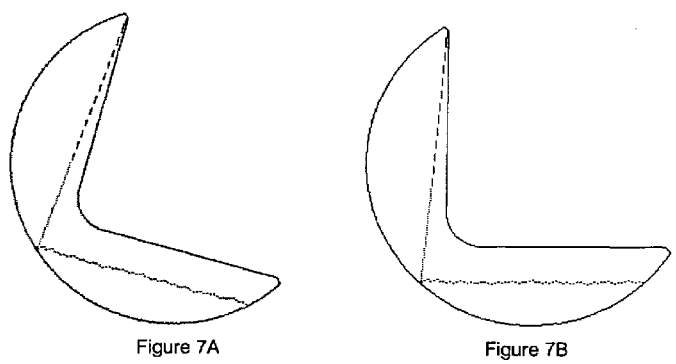
FIGS. 7A and 7B illustrate a return to home position cycle of an embodiment device.

The third phase of the physical cycle begins when the second phase of the physical cycle ends. The drive unit 220 again reverses the direction of motion of the First Assembly Unit 100. The controller 250 causes the motor 224 to reverse the direction of the sprocket 222 and begin turning clockwise as viewed from FIG. 1, causing the First Unit Assembly 100 to rotate in a counter-clockwise direction. The First Unit Assembly 100 partially rotates as shown in FIGS. 7A and 7B. The third phase ends when the position sensor trigger 166 is detected by third position sensor 266 of position sensing unit 260, as shown in FIG. 2. The result of the third phase puts the First Unit Assembly 100 back into its original home position.

The physical cycle has now ended. The controller 250 again begins monitoring the motion detector 240 for an obstruction in the line of sight of the infrared transmitter 242 and infrared detector 244 in order to continue operation (see section 2, Obstruction Detection and Delay).

The controller 250 that monitors detection of motion from the motion detector 240, performs a delay, performs monitoring of the position sensing unit 260, and performs motor 224 activation is a device, or combination of devices, familiar to those of reasonable skill in the art of building electronic devices.

In the preferred embodiment, position sensor triggers 162, 164, 166 are permanent magnets, whereas position sensors 262, 264, 266 are hall effect sensors.

In another embodiment reed switches may be used instead of hall effect sensors for position sensors 262, 264, 266. The permanent magnets used in the preferred embodiment as position sensor triggers 162, 164, 166, may also be used in this embodiment.

In another embodiment protrusions (or bumps) may be used instead of permanent magnets for position sensor triggers 162, 164, 166, and lever switches or push buttons may be used instead of hall effect sensors as position sensors (262, 264, 266). This requires tight tolerances in construction as the bumps or other protrusions must be precisely located so as to mechanically trigger the lever switches or push buttons.

In another embodiment, the position sensing unit 260 may comprise one single position sensor, used in conjunction with three triggers. In this embodiment, all three triggers are placed in-line with one another so that all three position sensor triggers can pass over the single position sensor. In this embodiment, a smarter controller 250 that better understands which phase is being preformed during the physical cycle is required. In this embodiment, the First Unit Assembly 100 must either be initially placed on top of the Second Unit Assembly 200 such that the single position sensor is located between position first sensor trigger 162 and third position sensor trigger 166, or the controller 250 must be further developed to briefly ignore position third sensor trigger 166 during the first partial rotation of initialization. This is a cost-reducing embodiment, as the enhanced programming of the controller 250 is typically inexpensive or free, whereas the purchase and installation of the two otherwise unneeded position sensors would incur higher manufacturing costs.

In another embodiment, an infrared emitter/detector pair is used instead of a single position sensor as described in the previous embodiment. The infrared emitter would be placed on one side of track 110, and an infrared detector would be placed on the other side of the track 110 at the position where sensors 262, 264, 266 are located when viewed from FIG. 1. Permanent magnets would not be used in this embodiment; instead, holes would be drilled through both sidewalls of track 110 approximately at positions 162, 164, and 166, such that line-of-sight may be established through the track from the infrared emitter to the detector, but in such a way so as not to negatively effect the operation of the physical cycle. Furthermore, the position of these holes need not be precise and may be optimized to fall between the teeth of track 110. In this embodiment, a more intelligent controller is also required as described in the previous embodiment; however infrared emitters/detectors are typically even more cost effective than a single hall effect sensor, and no permanent magnets would be required for position sensor triggers.

In another embodiment, a step could be added to allow easier ingress/egress of an animal to/from the unenclosed litter compartment 120.

Figure 14:
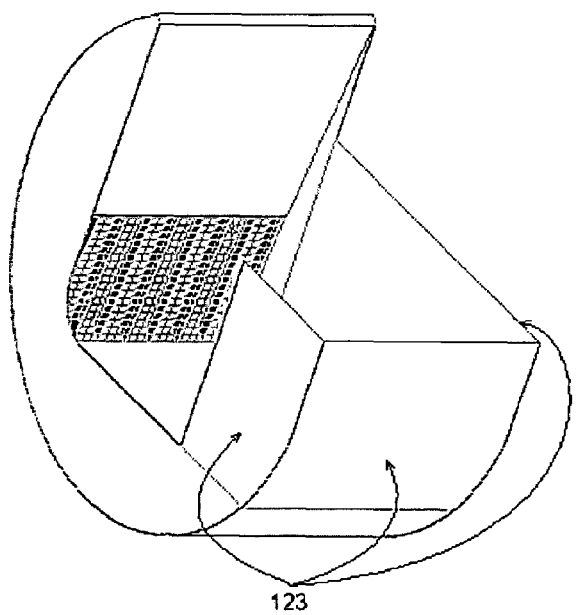
FIG. 14 is a perspective view of an embodiment First Unit Assembly with raised sidewall extensions installed.

In another embodiment, the height of one or more of the sidewalls 122 of the First Unit Assembly 100 could be raised to help contain litter 130. A hole in the sidewalls 122 would have to be added if the way the sidewalls 122 were extended would obstruct the line-of-sight between the infrared/emitter detector pair 242, 244. As long as an opening was preserved to allow ingress/egress of an animal, two sides, plus part of a third side could be raised as shown in FIG. 14. These extensions 123 could be permanent in one embodiment, or optionally snap, screw, or otherwise fastened into place to extend the shallow sides 122 of the First Unit Assembly 100 after a pet has adjusted to the device. Raised Sides 123 could be added one at a time as the tolerance of the pet was observed to determine the practicality of the enhancement.

In another embodiment, the step described in a previous embodiment could be used in conjunction with a pressure switch in lieu of the infrared emitter/detector pair 242, 244 to detect the passage of an animal. In this embodiment, the pressure switch would trigger the timer contained within the controller 250 upon ingress/egress of an animal. The delay (typically 10 minutes) would be long enough so as to not activate the physical cycle while the animal was in unenclosed litter compartment 120, as an animal would be unlikely to want to remain in the litter box for that long, and would reset the timer again when the animal vacated the litter box, activating the physical cycle 10 minutes after leaving. This step would ideally cover the entire surface where an animal may ingress/egress the litter box. With raised sidewalls 122, a small step may be used in front of the area where the animal may ingress or egress the litter compartment 120. Without sidewalls 122, the animal may ingress/egress the litter compartment from all three unenclosed sides of the litter box, and therefore a U-shaped step, and potentially multiple pressure switches, may be preferable for this embodiment. In this embodiment, only one of the multiple pressure switches would need to be actuated in order to trigger the timer in the controller.

In another embodiment, the unit 10 may be manually operated. No motor 224 or controller 250 is required for this embodiment. Instead, a human manipulates the First Unit Assembly manually. This can be made easier by providing a drive unit in the form of one or more handles attached to the First Unit Assembly 100 in strategic locations so as not to hinder the operation of the device. One such location would be the front and top of the First Unit Assembly 100 as observed in the home position. When a handle is attached to the front edge of the first unit assembly 100, the handle should ideally be angled upward in order that the leveling phase partial rotation can be fully realized. The handle may also-be high enough to allow manual operation while minimizing the stooping required to reach the handle. The brackets that attach the handle to the First Unit Assembly 100 may be attached in such a way as to allow the handle to pivot, allowing for easier operation and guaranteed clearance of the Second Unit Assembly 200. Another such location could be on the top edge of the First Unit Assembly 100. When attached to the top edge of the First Unit Assembly 100, the handle ideally extends significantly beyond the top edge of the First Unit Assembly, and is pivotally mounted. The handle may extend significantly in order to allow passage of waste material 132 over the screen 140 and temporary compartment 150 and into the waste receptacle 300 without being intercepted by the handle or the hand of the person manually operating the device. Other locations for handles, knobs, or other such devices to be attached to the First Unit Assembly 100 could also be used.

Figure 8:
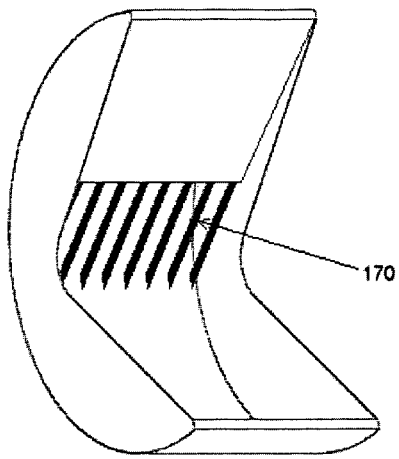
FIG. 8 is a perspective view of an embodiment First Unit Assembly with supports slats unobstructed by a filtering screen.
Figure 9:
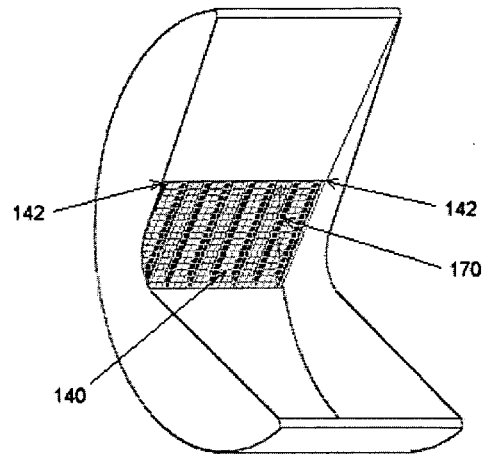
FIG. 9 is a perspective view of an embodiment First Unit Assembly with supports slats and installed screen.

In another embodiment, support strips can be placed on one side of the screen 140 to prevent flexible screens 140 from deforming significantly when litter 130 is communicated away from the unenclosed litter compartment 120 and toward the temporary container 150 during the separation phase, as depicted in FIGS. 5A through 5K. These support strips, depicted in FIGS. 8 & 9, may be called slats 170. Several slats 170 may be attached, as depicted in FIG. 8. The flexible or pivotally mounted screen 140 is mounted on a mount point 142 and rests against the slats 170, as depicted in FIG. 9. The screen 140 may be either flexible or rigid, or some degree in between. A rigid screen 140 would need no support slats 170 in order to prevent the screen 140 from deforming during the separation phase. A flexible screen 140 might benefit from support slats 170 depending on the memory qualities of the material used in constructing the screen 140. Materials that have poor memory qualities or insufficient stiffness to prevent significant deformity during the separation phase may require support slats 170 in order to ensure proper operation of the device. These support slats 170 do not significantly inhibit litter traversal during the separation phase or the litter reintroduction phase, but prevent the screen 140 from significantly deforming during the separation phase while not interfering with the flexible or pivotally mounted screen's 140 operation during the litter reintroduction phase. By pivotally mounting the screen 140 at the pivot points 142, the litter may travel under the screen 140 instead of having to travel through the screen 140 during the reintroduction phase.

Figure 10:
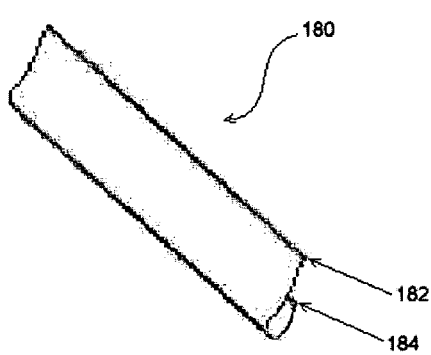
FIG. 10 is a perspective view of a membrane.
Figure 11:
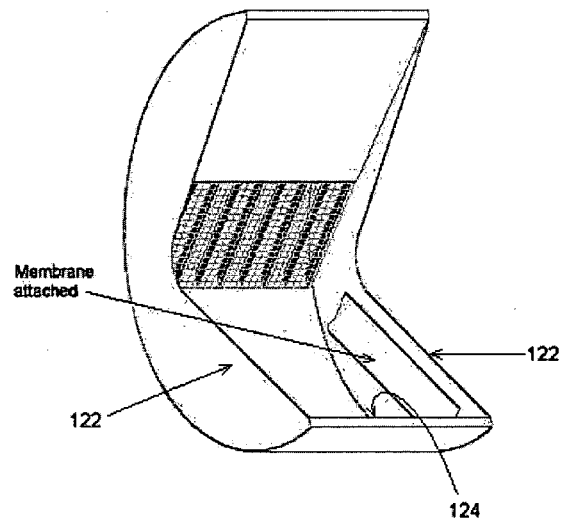
FIG. 11 is a perspective view of an embodiment First Unit Assembly illustrating attach points for one of the three membranes.

In another embodiment, as shown in FIGS. 10 and 11, a flexible membrane 180 made of rubber, plastic, or other waterproof and flexible material may be added to the interior of the unenclosed litter compartment 120. A membrane 180 may be attached in various ways to help dislodge litter clumps that might otherwise become stuck to the sides of the unenclosed litter compartment 120. FIG. 10 shows the membrane attachment locations along the top 182 and bottom 184 edges of the membrane 180. The membrane 180 is mounted with a generous amount of slack from top to bottom mounting locations 182, 184. The membrane 180 would facilitate dislodging of waste clumps during the separation phase (shown in FIGS 5A through 5K) of the physical cycle by allowing waste clumps to "peel away" from the membrane 180 instead of sticking to the rigid sides of the unenclosed litter compartment 120. Membranes 180 may be attached to both sides 122 of the unenclosed litter compartment 120, as well as the inside-front 124 of the unenclosed litter compartment 120.

Figure 12:
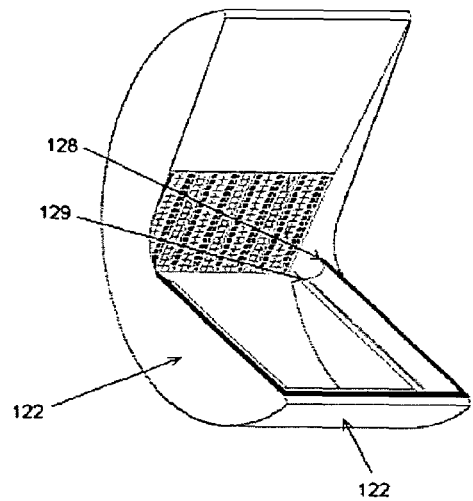
FIG. 12 is a perspective view of an embodiment First Unit Assembly with drip caps and a lip.
Figure 13:
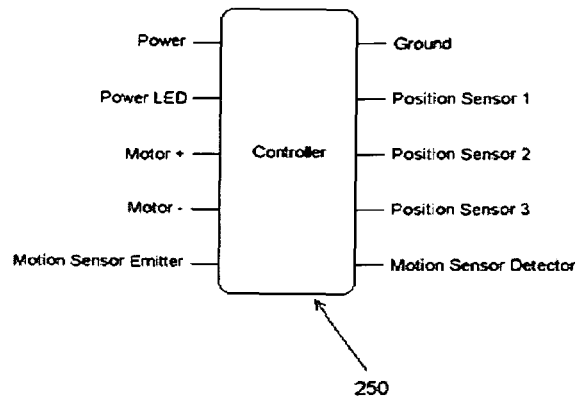
FIG. 13 shows a controller.

In another embodiment, depicted in FIG. 12, a lip 128 on the top inside edges of the three open sides 122 of the unenclosed litter compartment 120 could be added to help contain litter 130. The lip 128 may be attached along the accessible sides 122 of the unenclosed litter compartment 120. When cats bury their waste, litter 130 will tend to pile against one or more sides 122 of the unenclosed litter compartment 120, forming a ramp for subsequently flung litter 130 to fly out of the litter box 120. A lip 128, for example in the form of either a shelf edge or a partial cylinder, may be used to prevent substantial amounts of litter 130 from exiting the unenclosed litter compartment 120. In the shelf edge configuration, the lip 128 would prevent litter 130 from exiting the litter box 120 by preventing the litter 130 from ascending beyond the height of the unenclosed litter box sides 122. In the partial cylinder configuration, litter 130 would be redirected by the partial cylinder back into the unenclosed litter compartment 120. Litter 130 would not be prevented from ascending above the top edge of the unenclosed litter compartment 120, but the partial cylinder would direct the litter 130 back into the unenclosed litter compartment 120 laterally. Other shapes could also be used to redirect litter 130 without having to raise the sides 122 of the litter box 120. This lip 128 would help direct litter 130 that would otherwise be flung out of the litter box 120 back into the litter box 120.

In another embodiment, a drip cap 129 can be used. A drip cap 129 may be attached along, one or more of the top edges of the unenclosed litter compartment 120. FIG. 12 shows a drip cap 129 attached along the three accessible sides 122 of the unenclosed litter compartment 120. The purpose of the drip cap 129 is to force urine to drip towards the interior of the unenclosed litter compartment 120 instead of toward the sides 122. This prevents litter clumps 132 from sticking to the sides 122 of the unenclosed litter compartment 122. The drip cap 129 could be removable so as to make the unit easier to clean, although the drip cap 129 itself would facilitate the unit staying cleaner for a longer period of time. Although the drip cap 129 has the appearance of reducing the internal area of the unenclosed litter compartment 120, the drip cap 129 itself can be urinated on, so the area the animal can use to deposit waste 132 is still effectively the same size as it would be without the drip cap 129.

In another embodiment, the rear panel 232 of the Second Unit Assembly 200 is hinged at the top, and the Waste Receptacle 300 is inserted under the Second Unit Assembly 200 from the rear instead of the front as depicted in FIGS. 3 and 4. Therefore, the rear panel 232 of the Second Unit Assembly 200 and the handle 301 of the Waste Receptacle 300 are both located in the rear of the device. The hinge at the top allows for waste material 132 to accumulate and even mound slightly while still allowing the Waste Receptacle 300 to be removed. The hinged panel will pivot out of the way if mounded waste clumps 132 force it to do so as the Waste Receptacle 300 is slid out from under the Second Unit Assembly 200 from the rear of the device.

In another embodiment, the front and rear panels of the Second Unit Assembly 200 may snap in place at the top so that if an animal or child were to obstruct the operation of the unit, the panel would snap out of place and prevent pinching the animal or child. In the previous embodiment, where the rear panel is hinged form the top, the fixed portion of the top-rear side serves a dual purpose of conforming to the First Unit Assembly's 100 rear surface and track to seal out odors, and to provide a fixed surface to which one or more hinges can be attached. This fixed rear edge could snap into place as well, and therefore snap out of place preventing pinching of an animal or child.

The foregoing description is considered as illustrative only of the principles of the invention. Many modifications and variations are possible in light of the above teaching. Accordingly, all suitable modifications and equivalents may be resorted to falling within the scope of the invention as defined by the claims that follow.

What is claimed is:

1. An apparatus for receiving and disposing of animal waste comprising:
   a) a first unit assembly further comprising:
      (i) an unenclosed compartment open from above used to contain litter for the deposit of animal waste material that allows for ingress and egress of an animal from at least one direction;
      (ii) a temporary litter storage compartment laterally adjacent to and in communication with the unenclosed compartment;
      (iii) a screen located between the unenclosed compartment and the temporary compartment;
   b) a second unit assembly further comprising:
      (i) a base;

(ii) means within the base for movably and rotatably supporting the first unit assembly above the base;

(iii) means within the base, located below the means for supporting the first unit assembly, for receiving a waste receptacle such that the waste receptacle remains below the first unit assembly during a physical cycle;

(iv) means within the base for allowing communication of waste material from the first unit assembly to a waste receptacle;

c) a waste receptacle; and d) means for altering the orientation of the first unit assembly relative to the second unit assembly and the vector force of gravity;

whereby alteration of the orientation of the first unit assembly passes litter from the unenclosed compartment to the temporary compartment through the screen, waste material being restrained by the screen and discharged under the force of gravity to the waste receptacle, and wherein reversal of the orientation of the first unit assembly passes litter from the temporary compartment to the unenclosed compartment.

2. An apparatus as defined in claim 1, in which the first unit assembly is capable of being positioned in a first position relative to the second unit assembly prior to a physical cycle; wherein the first unit assembly is rotated to a second position to filter and expel the waste material, and then a subsequent opposite rotation of the first unit assembly passes through the first position to a third position to level the litter in the unenclosed litter compartment, and then reversing rotational direction again returns the first unit assembly back to the first position.

3. An apparatus as defined in claim 1, wherein the screen is pivotally attached such that a majority of filtered litter from the temporary compartment passes under the screen instead of through the screen into the unenclosed compartment.

4. An apparatus as defined in claim 1, wherein the waste receptacle is adapted to receive a waste storage bag.

5. An apparatus as defined in claim 1, wherein the first unit assembly has a common outer surface that is a partial cylinder.

6. An apparatus as defined in claim 1, wherein the first unit assembly has a common outer surface that is a partial sphere.

7. An apparatus as defined in claim 1, whereby the means for altering the orientation of the first unit assembly relative to the vector force of gravity further comprises:

a motor operatively associated with the first unit assembly and the base; and a controller in communication with the motor.

8. An apparatus as defined in claim 7, wherein the means for altering the orientation of the first unit assembly further comprises a position sensor unit for sensing the position of the first unit assembly relative to the second unit assembly base, and for supplying a position signal to the controller.

9. An apparatus as defined in claim 8, wherein the position sensor unit comprises hall effect sensors and permanent magnets.

10. An apparatus as defined in claim 8, wherein the position sensor unit comprises reed switches and permanent magnets.

11. An apparatus as defined in claim 8, wherein the position sensor comprises an infrared emitter and detector disposed in the base and holes in an outer surface of the first unit assembly.

12. An apparatus as defined in claim 8, further comprising a sensor for sensing the presence of an animal within the unenclosed compartment, and for supplying a presence signal to the controller.

13. An apparatus as defined in claim 12, wherein the sensor is a motion sensor.

14. An apparatus as defined in claim 12, wherein the sensor is an infrared emitter and detector.

15. An apparatus as defined in claim 1, further comprising support slats used to support the screen over an opening into the temporary compartment.

16. An apparatus as defined in claim 1, further comprising a lip to contain litter and waste material within the unenclosed compartment.

17. An apparatus as defined in claim 1, wherein the base has a front and a rear.

18. An apparatus as defined in claim 17, wherein the waste receptacle can be inserted and removed from the rear of the second unit assembly base.

19. An apparatus as defined in claim 18, wherein a rear panel of the base is hinged at a top of the rear panel to permit wider passage of the waste receptacle.

20. An apparatus as defined in claim 17, wherein the waste receptacle can be inserted and removed from the front of the second unit assembly base.

21. An apparatus as defined in claim 17, wherein the base has a front panel and a rear panel.

22. An apparatus as defined in claim 21, wherein the front and rear panels of the base are removably attached to the base and are adapted to detach to prevent injury to an animal or human during a physical cycle.

23. An apparatus as defined in claim 22 wherein the rear panel is further hinged to the base.

24. An apparatus as defined in claim 1, wherein the unenclosed compartment has sides.

25. An apparatus as defined in claim 24, wherein the sides of the unenclosed compartment are raised to contain litter and limit directions to and from which an animal can ingress and egress the unenclosed compartment.

26. An apparatus as defined in claim 24, further comprising a drip cap used to direct waste material away from the sides of the unenclosed compartment.

27. An apparatus as defined in claim 24, further comprising a membrane disposed within the unenclosed compartment to facilitate dislodging of waste material from the sides of the unenclosed compartment.

* * * * *